United States Patent [19]

Berghout et al.

[11] Patent Number: 4,956,744
[45] Date of Patent: Sep. 11, 1990

[54] MULTILAYER CAPACITOR

[75] Inventors: Cornelis W. Berghout; Hendrikus J. J. M. Van Haren, both of Eindhoven, Netherlands

[73] Assignee: U.S. Philips Corporation, New York, N.Y.

[21] Appl. No.: 319,005

[22] Filed: Mar. 3, 1989

[30] Foreign Application Priority Data

Mar. 7, 1988 [NL] Netherlands .......................... 8800559
Jan. 13, 1989 [NL] Netherlands .......................... 8900079

[51] Int. Cl.⁵ .......................... H01G 4/10; H01G 7/00
[52] U.S. Cl. .................................. 361/321; 29/25.42
[58] Field of Search ............... 29/25.42; 361/308, 309, 361/310, 320, 321

[56] References Cited

U.S. PATENT DOCUMENTS

| | | | |
|---|---|---|---|
| 3,811,937 | 5/1974 | Maher | 361/320 X |
| 3,900,773 | 8/1975 | Bowkley et al. | 361/320 X |
| 4,401,767 | 8/1983 | Dietz et al. | 361/411 X |
| 4,604,676 | 8/1986 | Senda et al. | 361/309 |

FOREIGN PATENT DOCUMENTS

| | | | |
|---|---|---|---|
| 11389 | 5/1980 | European Pat. Off. | 361/309 |
| 151529 | 10/1981 | German Democratic Rep. | 361/321 |

Primary Examiner—Donald A. Griffin
Attorney, Agent, or Firm—Norman N. Spain

[57] ABSTRACT

In a multilayer capacitor, which is made of alternate layers of a dielectric oxidic ceramic material and an electrode material, and which is provided with metallic end contacts which electrically conductively contact a prescribed part of the layers of electrode material via an intermediate layer of a conductive metal oxide, the metallic end contacts containing silver, the diffusion of silver from the end contacts to the layers of electrode material is suppressed effectively in that the electrode material consists of palladium with 1 to 10% by weight of lead. On account of this, the end contacts can be readily manufactured from a paste, and delamination, cracking and the formation of cavities in the vicinity of the end contacts are suppressed.

6 Claims, 1 Drawing Sheet

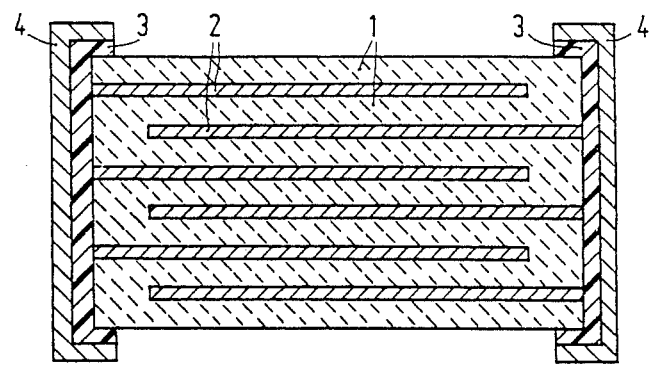

MULTILAYER CAPACITOR

BACKGROUND OF THE INVENTION

The invention relates to a multilayer capacitor comprising alternate layers of a dielectric oxidic ceramic material and a palladium-containing electrode material, and having metallic end contacts which electrically conductively contact a prescribed part of the layers of electrode material, the metallic end contacts containing silver.

The invention also relates to such a multilayer capacitor, in which the metallic end contacts electrically conductively contact the layers of electrode material via an intermediate layer of a conductive metal oxide.

The invention also relates to a method of manufacturing such a multilayer capacitor.

In the U.S. Pat. No. 4,604,676 such a multilayer capacitor is described, in which the electrode material consists of a mixture of silver and palladium and use is made of an intermediate layer. The intermediate layer is a homogeneous thin layer having a thickness which must not exceed 2 $\mu$m, the layer being applied by means of a thin-film deposition method such as sputtering, vapour deposition or chemical deposition from the vapor phase. Subsequently, for example, layers of Ni-Cr, Ni and/or Ag are applied by means of vapor deposition and sputtering so as to obtain solderable end contacts.

The intermediate metal oxide layer is provided to avoid a reduction of the ceramic material. Said reduction may occur as a result of diffusion of oxygen from the ceramic material to the metallic end contacts at a raised temperature, and it causes the insulation resistance of the ceramic material to be substantially reduced.

In an alternative method of manufacturing metallic end contacts, a mixture of metal, such as silver and, for example, palladium or other noble metals, and glass in the form of a paste is used. The paste can readily be applied by immersing and it can be fired together with the internal electrode layers of the multilayer capacitor. The metallic end contacts thus obtained contain a quantity of glass particles. However, in this method a number of problems are encountered, as will be explained hereinafter.

In the manufacture of multilayer capacitors, which are generally manufactured in large numbers, cracks are formed in a number of products and delamination occurs in the ceramic material near the end contacts. If these cracks reach the active part of the capacitor they may induce increased leakage currents, silver migration under the influence of an electric field and short-circuits between the inner electrodes. Moreover, cavities are then formed near the end contact and the bonding of the end contact material to the ceramic material is insufficient.

In experiments leading to the present invention it has been found that silver diffusion from the end contacts to the inner electrodes takes place predominantly during firing. The inner electrodes are made in the usual manner, preferably, of palladium which has a large affinity for silver. The volume and thickness of the inner electrodes increases locally which may lead to delamination and cracking. Outward migration of palladium caused by diffusion or increased pressure on the inner electrodes also takes place, albeit to a lesser extent. Owing to this, the material of the end contacts may become locally detached from the ceramic material and cavities may be formed. The formation of cavities may be counteracted by using a silver paste having a high glass-particle content, but then the problem arises that it is difficult to apply solderable layers onto such end contacts. Moreover, silver diffusion continues.

SUMMARY OF THE INVENTION

It is an object of the invention to provide a ceramic multilayer capacitor, having inner electrodes which are mainly composed of palladium, and a method of manufacturing the same, in which silver diffusion to the inner electrodes is effectively counteracted in order to reduce the number of rejects. A further object of the invention is to provide products which have no cracks and cavities in the vicinity of the end contacts and in which electrical faults are absent. An additional object of the invention is to provide a multilayer capacitor in which the end contacts can be manufactured, if desired, from a paste in a readily conceivable manner.

These objects are achieved according to the invention by a multilayer capacitor as described in the opening paragraph, which multilayer capacitor is characterized in that the electrode material comprises metallic lead.

The electrode material of the inner electrodes preferably consists of palladium with 1 to 10% by weight of lead. A quantity of lead below 1% by weight is substantially ineffective in suppressing silver diffusion. If a quantity exceeding 10% by weight of lead is used, the properties of the dielectric ceramic material are adversely affected.

BRIEF SUMMARY OF THE DRAWING

The sole FIGURE in the drawing is a schematic cross-sectional view of a ceramic capacitor according to the inventor.

DETAILED DESCRIPTION OF THE INVENTION

In a preferred embodiment of the multilayer capacitor in accordance with the invention, in which the metallic end contacts electrically conductively contact the layers of electrode material via an intermediate layer of a conductive metal oxide, a further improvement of the result is obtained in that the intermediate layer is a heterogeneous layer which comprises glass particles in addition to the conductive metal oxide, and which has a thickness of at least 1 $\mu$m.

In a very suitable embodiment, the glass particles consist of a glass composition comprising lead oxide. During firing of the paste, a part of the lead oxide is reduced to lead having sufficient affinity for palladium to form an additional protective layer between the palladium inner electrodes and the silver-containing end contacts, and which lead forms a very effective barrier against silver diffusion.

In a particular embodiment, the end contact comprises a layer of glass particles and a noble metal, preferably selected from silver and mixtures of silver and palladium. In a suitable embodiment the glass particles consist of a glass composition comprising lead oxide, the lead oxide content preferably exceeding 15% by weight.

In order to provide a suitable solderability for the multilayer capacity and suppress metal diffusion to the solder material, it is efficacious to cover the end contact with a common solder coating, for example a nickel layer followed by a layer of tin or lead-tin.

The object of providing a method of manufacturing a multilayer capacitor which is made of alternate layers of a dielectric oxidic ceramic material and an electrode material, which capacitor is provided with metallic end contacts which electrically conductively contact a prescribed part of the layers of electrode material, the metallic end contacts containing silver, is achieved by a method in which the layers of electrode material are manufactured from a paste comprising palladium, a temporary binder and lead in the form of lead oxide or metallic lead, the paste being fired in order to remove the temporary binder to form electrodes from a solid solution of metallic lead in palladium.

It is to be noted that in Japanese Patent Application JP No. 62-150808 a description is given of a multilayer capacitor, in which lead oxide is added to the material used for the manufacture of the inner electrodes in order to obtain the desired composition of the dielectric ceramic material which contains lead. The inner electrodes are composed mainly of silver, to which palladium is added, if desired. In such an environment, lead oxide remains present as an oxide. Due to the large quantity of silver in the inner electrodes, the problem of silver diffusion from the end contacts does not occur. Consequently, this problem is not discussed or indicated. However, electrode materials which consist predominantly of silver cannot suitably be used in combination with all the commonly used dielectric materials.

The invention will be explained in more detail by means of the following examples and with reference to the drawing.

EXAMPLE 1

A finely ground ceramic, dielectric powder, for example manufactured from $BaTiO_3$, is mixed with a binder, such as polyvinyl alcohol, a dispersing agent and water to form a slurry. The slurry is deposited in thin layers, for example having a thickness of 50 $\mu$m, which are dried to obtain foils.

A lead-containing palladium paste is manufactured from pure palladium containing less than 1% by weight of impurities lead in the form of finely dispersed lead oxide is added to this paste, for example in a quantity of 4% by weight, and the rest is palladium. The metal paste comprises, for example, 70% by weight of metal and metal oxide, 2 to 3% by weight of ethyl cellulose as a binder, and 2-ethoxy-ethyl acetate as a solvent.

The ceramic foils are provided with electrodes by means of screen printing using the palladium paste. The foils are stacked, for example in ten layers, compressed and divided into separate capacitor bodies, for example, having dimensions of $3 \times 1.5$ mm$^2$. The capacitor bodies are sintered at temperatures between 1100° and 1400° C., dependent upon the composition of the ceramic material, according to the present example at 1250° C. The ceramic material shrinks during sintering and densifies into a dense polycrystalline structure. The thickness of the ceramic layers amounts to approximately 25 $\mu$m. the powder particles of the metal paste are simultaneously sintered into electrode layers of metal which form a coherent unity with the dielectric layers. Moreover, the palladium reacts with the lead oxide to form a solid solution of metallic lead in palladium.

A metal oxide paste is manufactured from 60% by weight of $RuO_2$ powder and 40% by weight of glass particles, ethyl cellulose being used as a binder and 2-ethoxy-ethyl acetate as a solvent to obtain a suitable viscosity. The solids content of the paste amounts to 70 to 80% by weight, the quantity of binder amounts to 2 to 3% by weight and the rest is solvent. The composition of the glass particles, which have dimensions from 1 to 2 $\mu$m, is for example: 37% by weight of PbO, 18% by weight of $B_2O_3$, 22% by weight of $SiO_2$, 11% by weight of ZnO, 3% by weight of $Al_2O_3$, 1.5% by weight of $Na_2O$ and 7.5% by weight of BaO.

Prior to the manufacture of the end contacts, the capacitor bodies are partly immersed in the metal oxide paste and fired at 850° C., layers having a thickness of approximately 15 $\mu$m being formed on both sides. The resistivity of the layers formed amounts to approximately 0.01 $\Omega$ cm.

Subsequently, end contacts are manufactured from a metal paste consisting of 95% by weight of silver particles and 5% by weight of glass particles, for example having the composition as has been described. The binder and the solvent used are also the same as in the metal oxide paste. The metal paste is fired at a temperature of 750° C. If desired, solderable layers of Ni and/or Sn/Pb are additionally provided electrolytically or by means of electro-deposition or vacuum evaporation.

The Figure is a schematic cross-sectional view of a ceramic capacitor according to the invention, which comprises ceramic layers 1 and internal electrode layers or inner electrodes 2, and which is provided with metallic end contacts 4 having conductive intermediate layers 3.

Microscopic observations have shown that cracking and delamination do not occur anymore to an appreciable extent. The end contacts with the intermediate layers are firmly bonded to the capacitor body and the number of cavities in the visicinity of the end contacts is strongly reduced.

EXAMPLE 2

Ceramic multilayer capacitors are manufactured as indicated in Example 1, the intermedicate layers 3 from the metal oxide paste being omitted.

The result is satisfactory and better than in the case of ceramic capacitors having leadless inner electrodes, but it is not as good as the result obtained in Example 1.

The invention provides ceramic multilayer capacitors and a method of manufacturing thereof, their quality being improved and the number of rejects being substantially reduced. Comparative experiments have shown that silver diffusion to the inner electrodes can be effectively suppressed as well as the negative consequences of such a diffusion.

A number of additional advantages are obtained by employing the measures in accordance with the invention. The glass which is commonly added to the metal paste used for the manufacture of end contacts is mainly used to fill up cracks and cavities so as to suppress the harmful effects of silver diffusion. When silver diffusion no longer occurs, the glass content of the silver paste can be selected to be very low (less than 5% by weight) or the glass can even be omitted. It is alternatively possible to manufacture an end contact which is composed of two layers, the first layer consisting of a glass-containing silver paste and the second layer consisting of a glass-free silver paste, which layers can be fired simultaneously.

We claim:

1. A multilayer capacitor comprising alternate layers of a dielectric oxidic ceramic material and an electrode material which consists predominantly of palladium, the capacitor having metallic end contacts which electrically conductively contact a prescribed part of the layers of electrode material via an intermediate layer of a conductive metal oxide, the metallic end contacts containing silver and wherein the electrode material comprises metallic lead and the intermediate layer is a heterogeneous layer which comprises glass particles in addition to the conductive metal oxide and has a thickness of at least 1 $\mu$m.

2. A multilayer capacitor as claimed in claim 1, characterized in that the glass particles consist of a glass composition comprising lead oxide.

3. A multilayer capacitor comprising alternate layers of a dielectric oxidic ceramic material and an electrode material which consists predominantly of palladium, the capacitor having metallic end contacts which electrically conductively contact a prescribed part of the layers of electrode material, the metallic end contacts containing silver and wherein the electrode material comprises metallic lead and the end contacts comprise a layer of glass particles and a noble metal selected from silver and mixtures of silver and palladium.

4. A multilayer capacitor as claimed in claim 3, characterized in that the glass particles consist of a glass composition comprising a lead oxide.

5. A multilayer capacitor comprising alternate layers of a dielectric oxide material and an electrode material which consists predominantly of palladium, the capacitor having metallic end contacts which end contacts electrically connectively contact a prescribed part of the layers of electrode material and which end contacts contain silver and wherein the electrode material comprises a glass composition comprising lead oxide.

6. A method of manufacturing a multilayer capacitor comprising alternate layers of a dielectric oxidic ceramic material and an electrode material which consists predominately of palladium, the capacitor having metallic end contacts which electrically conductively contact a prescribed part of the layers of electrode material, the metallic end contracts containing silver, characterized in that the electrode material comprises metallic lead and in that the layers of electrode material are manufactured from a paste consisting predominately of palladium, a temporary binder and lead in the form of lead oxide or metallic lead, the paste being fired in order to remove the temporary binder to form electrodes from the resultant solid solution of metallic lead in palladium.

* * * * *